Nov. 25, 1930.　　J. KIVIAHO　　1,783,123
HOSE CLAMP APPLYING TOOL
Filed April 5, 1928
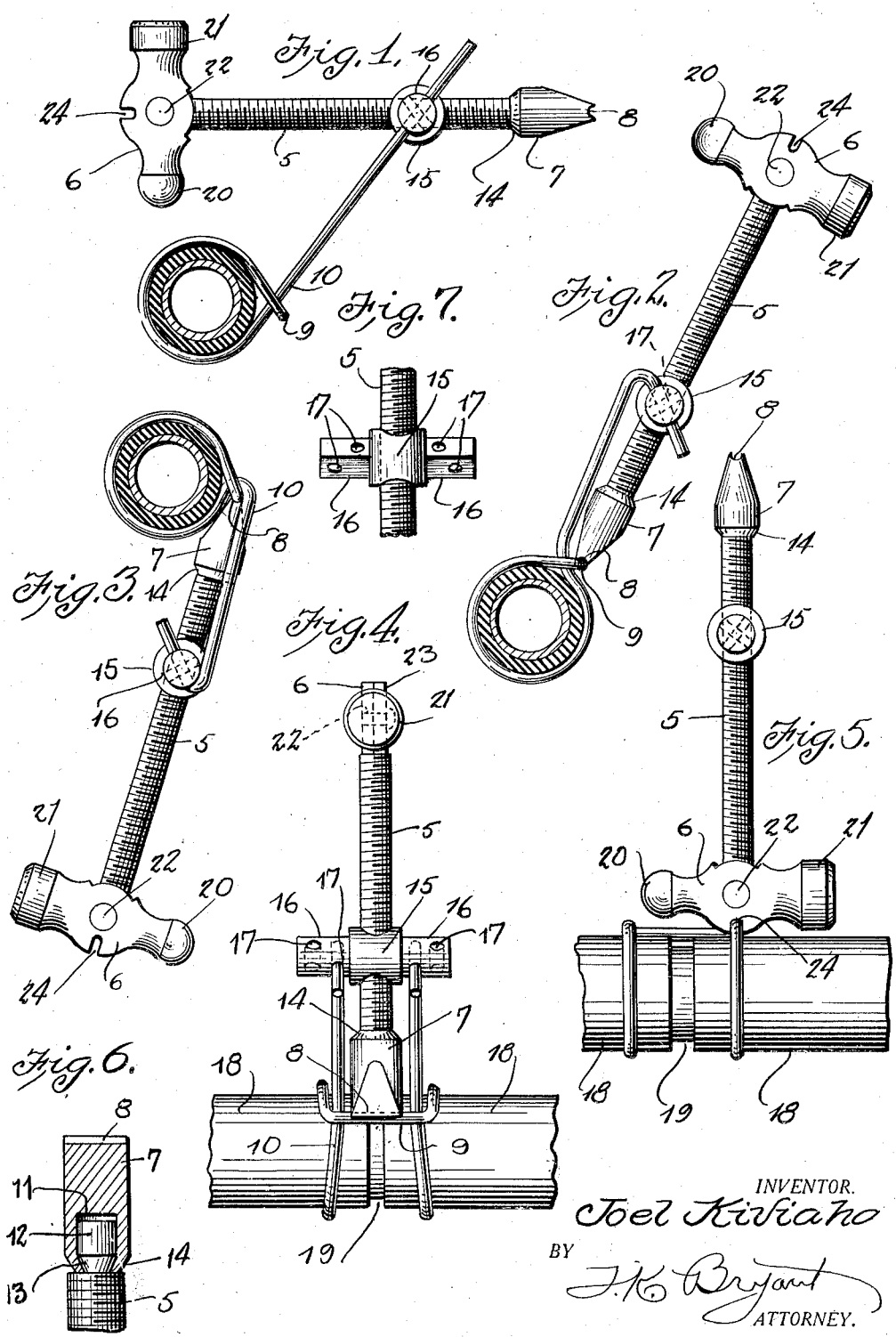
INVENTOR.
Joel Kiviaho
BY
J. K. Bryant
ATTORNEY.

Patented Nov. 25, 1930

1,783,123

UNITED STATES PATENT OFFICE

JOEL KIVIAHO, OF MARSHFIELD, OREGON

HOSE-CLAMP-APPLYING TOOL

Application filed April 5, 1928. Serial No. 267,719.

This invention relates to a tool for applying wire clamping bands in the coupling of hose sections, and has for its primary object to simplify and improve the construction, as well as to increase the efficiency and utility of devices of this character.

Another object of the invention is to provide a device of the above kind in which simple and efficient provision is made for effecting a convenient and ready holding engagement of the tool with the ends of the clamping band.

Other objects will become apparent as the nature of the invention is better understood, and the same consists in the novel form, combination and arrangement of parts hereinafter more fully described, shown in the accompanying drawing and claimed.

In the drawing:

Figure 1 is an elevational view of a tool embodying the present invention, illustrating the first step in using the tool to apply a wire clamping band in coupling hose sections;

Figure 2 is a view similar to Figure 1 illustrating the tool as in the second step of applying the band;

Figure 3 is a view similar to Figure 2 illustrating the third step in applying the clamping band;

Figure 4 is an elevational view looking toward the left of Figure 2;

Figure 5 illustrates the use of the tool in cutting wire as in the act of removing old clamping bands which are to be renewed; and Figure 6 is a fragmentary detail view, partly in longitudinal section and partly in elevation, showing the manner in which the shoe or bearing member is swiveled to the end of the threaded rod or stem of the tool.

Fig. 7 is a fragmentary detail view, showing the stud on the threaded rod or stem of the tool.

The present tool comprises a threaded rod or stem 5 having a turning handle or cross member 6 at one end, and rotatably fitted and secured at its other end in a shoe or bearing member 7. The shoe or bearing member 7 is preferably tapered upon opposite sides and formed at its outer free end with a transverse groove 8 to snugly fit or seat upon the intermediate transverse member 9 of the wire hose clamping band 10 so that it will be retained upon the member 9 without slipping. As shown clearly in Figure 6, the shoe or bearing member 7 is provided with an axial socket 11 in which the adjacent reduced end portion 12 of the rod or stem 5 is rotatably fitted, and provided in the reduced end portion 12 adjacent its point of connection with the threaded part of the rod 5 is an annular groove 13 into which the adjacent end of the shoe or bearing member 7 is swaged or peened as at 14. In this way the shoe or bearing member 7 is effectively swiveled to the end of the rod or stem 5, the connection being quite effective and accomplished without the use of frail or separate pins or the like.

A nut member 15 engages the threads of the rod or stem 5 and is formed with oppositely projecting integral studs or pins 16 of uniform cross-sectional shape from end to end. As shown in Figure 7, the studs 16 may be of rectangular form, or they may be of cylindrical form as shown in the remaining figures. Each stud is provided with a pair of transverse openings 17 of a size to snugly receive the ends of the clamping band 10 and disposed at right angles to each other obliquely to the longitudinal axis of the stem 5 as clearly shown in Figures 1 to 3 inclusive.

The wire clamping band 10 is normally of U-shape, and when originally applied, the ends thereof are extended between the legs of the same behind or inwardly of the connecting portion 9 as shown in Figure 1. The ends of the clamping bands 10 are then disposed to engage in desired ones of the openings 17, depending upon the size of the clamping band and the position at which the tool is disposed relative to the latter. This step in the use of the tool is clearly illustrated in Figure 1, and the tool is then turned bodily about the axes of the studs 16 so that the ends of the band 10 are bent toward the intermediate portion 9 with the shoe or bearing member brought to engage the connecting portion 9 as shown in Figure 2. In this way effective connection of the ends of the clamping band with the nut member 15 is provided without the use of separate clamps, set screws or the like, and this without danger of the wire turning relative to the studs 16. Upon inspection of Figures 4 and 7, it will be seen that the openings 17 extend through the studs 16 in planes angular with respect to the axis of the tool stem 5. It is therefore apparent that the device is adapted for applying clamping bands of different widths, or clamping bands wherein the legs thereof are spaced different distances apart. As is well known, tools of this character are used in effecting coupling of hose sections 18 in the adjacent ends of which is positioned a coupling sleeve 19 of rigid form, the band 10 being applied about the adjacent ends of the hose sections 18 to firmly clamp them about the sleeve 19, as will be obvious. After the tool has been positioned as in Figure 2, the hose is effectively held against turning, and the tool is swung around the connecting portions 9 of the clamping band 10 to the position of Figure 3, turning the projecting end portions of the clamping band about the connecting portions 9 to effect a final application of the clamps. The projecting ends of the latter are then cut off, and the implement together with the cut-off portions of the clamping band are removed. It will of course be understood that when the tool is disposed as in Figure 2, the stem 5 is rotated to cause outward movement of the nut member 15 whereby the clamping band is drawn tightly upon the hose.

The angularity of the openings 17 with respect to the longitudinal axis of the stem 5, and their position as spaced from the ends of the studs 16, is of particular advantage, as will be understood from a comparison of Figs. 1 and 2. Band clamps for this purpose always have their free ends straight, and as shown in Fig. 1, the particular arrangement is such that by initially placing the tool in a position different from that which it occupies during the band tightening operation, the studs can be readily placed on the free ends of the band and slid along such ends to a desired position such as would approximate the distance between the notch 8 and the stud position with that of the length of the ends which project from the cross-portion 9. By then simply turning the tool to position the groove 8 on the band 9, thus placing the tool in its tightening position, the ends of the band are bent as in Fig. 2, without straining the wire, and an efficient lock is provided to resist the pressures provided when the stem is rotated to tighten the band, such pressures simply increasing the lock effect due to the fact that, in this position, the bend provides that the stud-engaged portion of the wire is then extending beyond a position at right angles to that of the portion of the wire leading to the bend from the band; in other words, the bend provides the two parts leading from the band as extending in directions angular to each other but with the angle between them less than a right angle. Hence there is no likelihood of the wire being broken under the stress, and at the same time the full stress can be provided without slippage.

The advantage of this lies in the fact that the lock is obtained without requiring any structure other than the openings themselves, so that by a simple operation of the simple opening-provided studs, the simple manipulation of the tool referred to is all that is required to provide the complete preparation of the parts for tightening purposes.

And in this connection, the location of the pair of openings 17 of a stud at right angles to each other, is of advantage. As will be understood by inspecting Fig. 2 or Fig. 3, the application of the stress provides a heavy pressure condition on the underside of the stud—the side which faces the clamp. With a series of openings spaced apart a short distance and parallel to each other, the presence of the additional openings would tend to weaken the stud to resist this pressure. By placing the openings at right angles, the weakening is present only at the point where the planes of the axes of the openings intersect, and this is located only at the center of the stud, so that liability of the stud to split is reduced to a minimum, while at the same time the openings can be located fairly close together, and thus provide for use with bands of different sizes and without requiring excessive bending of the straight arms to position the studs.

In view of the above it will be seen that the device is extremely simple in construction, can be economically manufactured, and operate efficiently for the purposes described.

As shown clearly in the several views, the handle or cross-piece 6 may consist of a plate having a flat intermediate portion and rounded enlarged ends 20 and 21 forming hammer heads, the handle having its intermediate flat portion pivoted as at 22 to an integral plate-like extension 23 on the adjacent end of the rod or stem 5. These parts 6 and 23 are formed in their outer edges with cooperating notches 24 formed with opposed cutting edges in a well known manner to form a wire cutter. The handle or cross-piece is thus pivoted upon a transverse axis to the stem 5, and by positioning the tool as shown in Figure 5 and tilting the stem 5 laterally, one of the hammer heads will engage the hose section so as to hold the cross-piece 6 against swinging whereby the extension 23 will act as the severing blade for the wire cutter in opposition to the cutting edge of the cross-piece 6. However, it is to be understood that the rod or stem 5 may be provided with any convenient form of cross-bar or handle for use in turning the stem 5 in the hose clamp applying operation.

Minor changes may be made without departing from the spirit and scope of the invention as claimed.

What I claim as new is:—

1. A device of the class described comprising a threaded rod having a turning handle at one end and a clamping band engaging shoe at the other end in which the threaded rod is rotatably mounted, and a nut engaging the threads of the rod and having laterally projecting studs provided with transverse openings spaced from the stud ends to receive the ends of the clamping band, said openings being disposed angularly to the longitudinal axis of said threaded rod, whereby the tool is applied to the ends of the clamping band while out of tightening position and the band ends will become anchored for tightening purposes by swinging the tool to its tightening position.

2. A device of the class described comprising a threaded rod having a turning handle at one end and a clamping band-engaging shoe at the other end in which the threaded rod is rotatably mounted, and a nut engaging the threads of the rod and having laterally projecting studs provided with pairs of openings spaced from the stud ends and disposed angularly to the longitudinal axis of said threaded rod, the openings of a pair having their respective axes extending at approximately right angles to each other.

In testimony whereof I affix my signature.

JOEL KIVIAHO.